INVENTOR.
ADOLF J. DE MATTEO
BY
Kenyon & Kenyon
ATTORNEYS

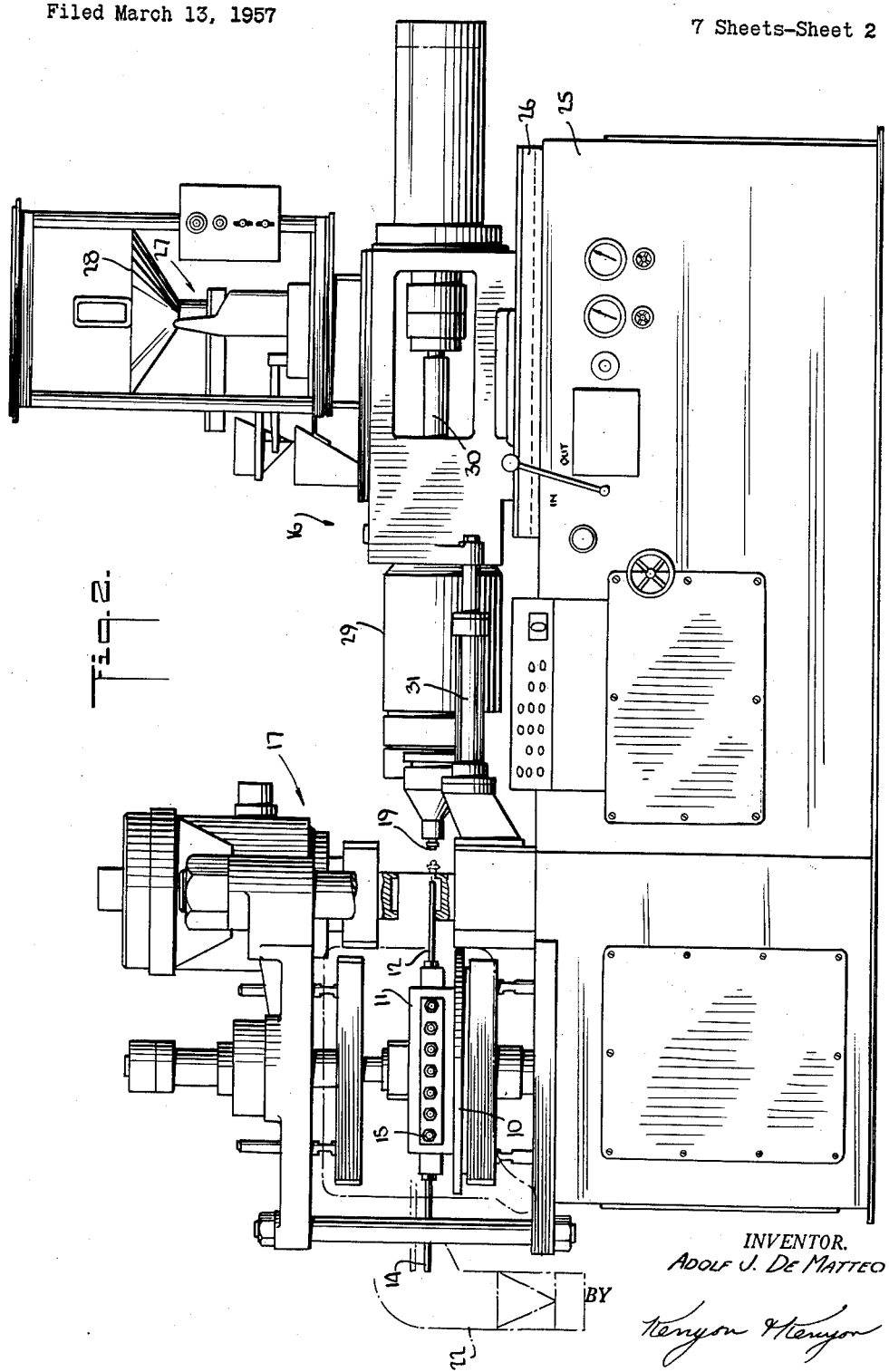

Aug. 20, 1963   A. J. DE MATTEO   3,100,913
MULTIPLE INJECTION MOLDING APPARATUS
Filed March 13, 1957                7 Sheets-Sheet 3

INVENTOR.
ADOLF J. DE MATTEO
BY
Kenyon & Kenyon
ATTORNEYS

Aug. 20, 1963

A. J. DE MATTEO 3,100,913

MULTIPLE INJECTION MOLDING APPARATUS

Filed March 13, 1957

INVENTOR.
ADOLF J. DE MATTEO
BY
Kenyon & Kenyon
ATTORNEYS

United States Patent Office 3,100,913
Patented Aug. 20, 1963

3,100,913
MULTIPLE INJECTION MOLDING APPARATUS
Adolph J. De Matteo, Berkeley Heights, N.J., assignor to Farrel-Birmingham Company, Inc., Ansonia, Conn., a corporation of Connecticut
Filed Mar. 13, 1957, Ser. No. 645,745
6 Claims. (Cl. 18—20)

The present invention relates generally to injection molding apparatus for automatically forming hollow-shaped articles and other small cored objects from thermoplastic materials.

In the manufacture of squeeze bottles from flexible plastic materials, such as polyethylene, it has heretofore been the practice to extrude an elongated tube from a conventional screw extruder, a short length of the tube being trapped and inflated into the shape of the bottle. This process has certain shortcomings from the commercial standpoint, for it is relatively slow and the operation is limited to bottles which may be blown from a parison having uniform wall sections.

It is also possible to make squeeze bottles by an injection molding process wherein a parison of organic plastic material is molded at a first station and transferred to a second station to be expanded by fluid pressure into the finished shape, the object then being rigidified. This technique entails three distinct cycles of operation. First, the parison must be molded in a parison mold, after which it is placed in the blow mold and blown up to its desired configuration and permitted to set, and finally the blown bottle is removed from the blow mold and ejected. This process is somewhat more rapid than extrusion and obviates the shape limitation, since now the parison can be made in any desired section to place material where it is needed for proper expansion in the ultimate blow shape. Nevertheless, the need for three successive cycles of operation in the conventional injection process imposes definite limits on the speed of production.

In view of the foregoing, it is the principal object of the present invention to provide a novel injection molding apparatus for the production of hollow ware and other small cored objects which overcomes the drawbacks of conventional techniques.

More particularly, it is an object of the invention to provide an improved injection molding machine for manufacturing squeeze bottles wherein multiple molding of parisons, multiple blow molding and multiple ejection of finished articles are carried out concurrently in a single machine. A significant feature of the invention resides in the use of a turntable carrying four sets of parison pins, one set being acted upon in a parison molding station, the second being processed in a blow mold station, the third in an ejector station and the fourth in a testing station, all stations being simultaneously operative.

A further object of the invention is to provide an efficient and reliable injection molding machine for producing hollow objects at an exceptionally high rate of speed.

For a better understanding of the invention as well as other objects and further features thereof reference is had to the following detailed description to be read in conjunction with the accompanying drawings wherein like components in the several views are identified by like reference numerals.

Briefly stated, in a preferred embodiment of an injection molding machine in accordance with the invention for automatically forming hollow articles of plastic material there is provided a turntable having a square turret from whose walls are projected four sets of parison pins. Four stations surround the turntable and cooperate with respective sets of pins, the turntable being indexed to cause each set of pins to occupy successive stations. One station includes partible parison molds and means to clamp the mold halves about the pins as well as an injection unit to inject plastic material into the closed parison molds under pressure. The second station includes partible blow-up molds and means to clamp these molds about the parisons. The third station includes a hopper to receive ejected finished articles, while the fourth station includes means to test said pins to insure clearance thereof prior to their re-introduction into said first station.

In operation the turntable is caused to index whereby each set of pins travels from station to station in the order given and remains there for a period sufficient to complete the molding operations. Air is fed into the pins at the second, third and fourth stations, this being accomplished by a valve action which cooperates with the turntable and which excludes air from the set of pins occupying the first station, the air being excluded from all pins in the course of indexing.

In the drawings:

FIG. 8 is a sectional view taken along the plane of lines 8—8 in FIG. 7.

Figure 1:
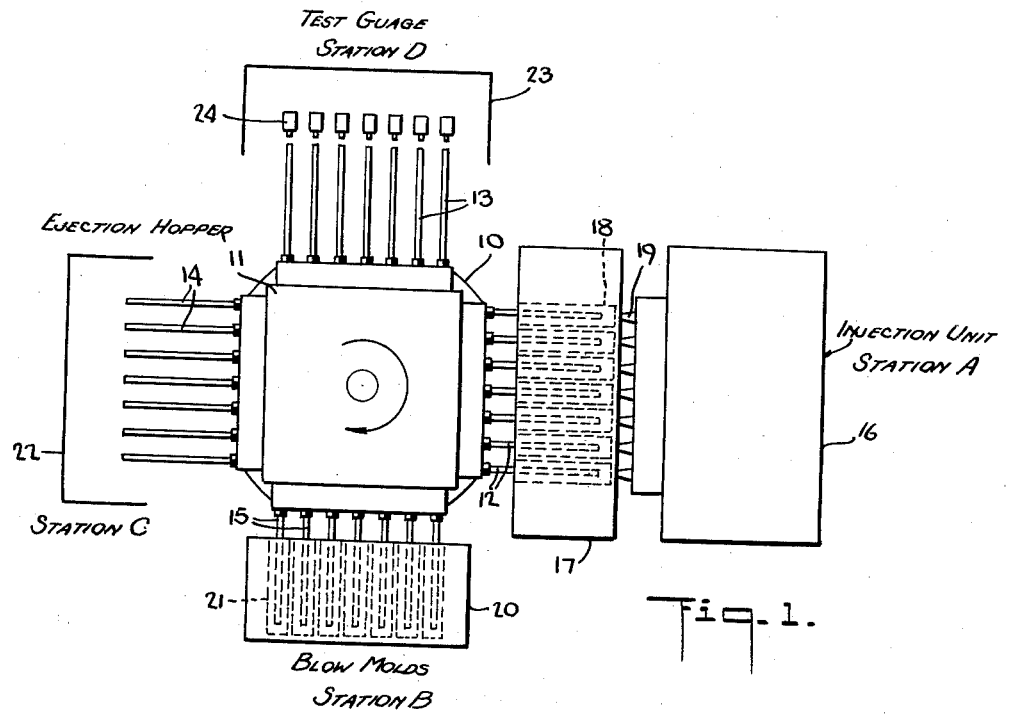
FIG. 1 is a schematic representation of the machine in accordance with the invention.
Figure 2:
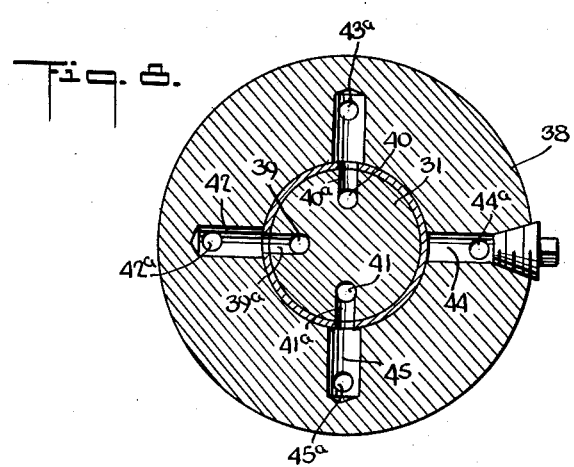
FIG. 2 is a front elevational view of a preferred embodiment of an injection molding machine in accordance with the invention.
Figure 3:
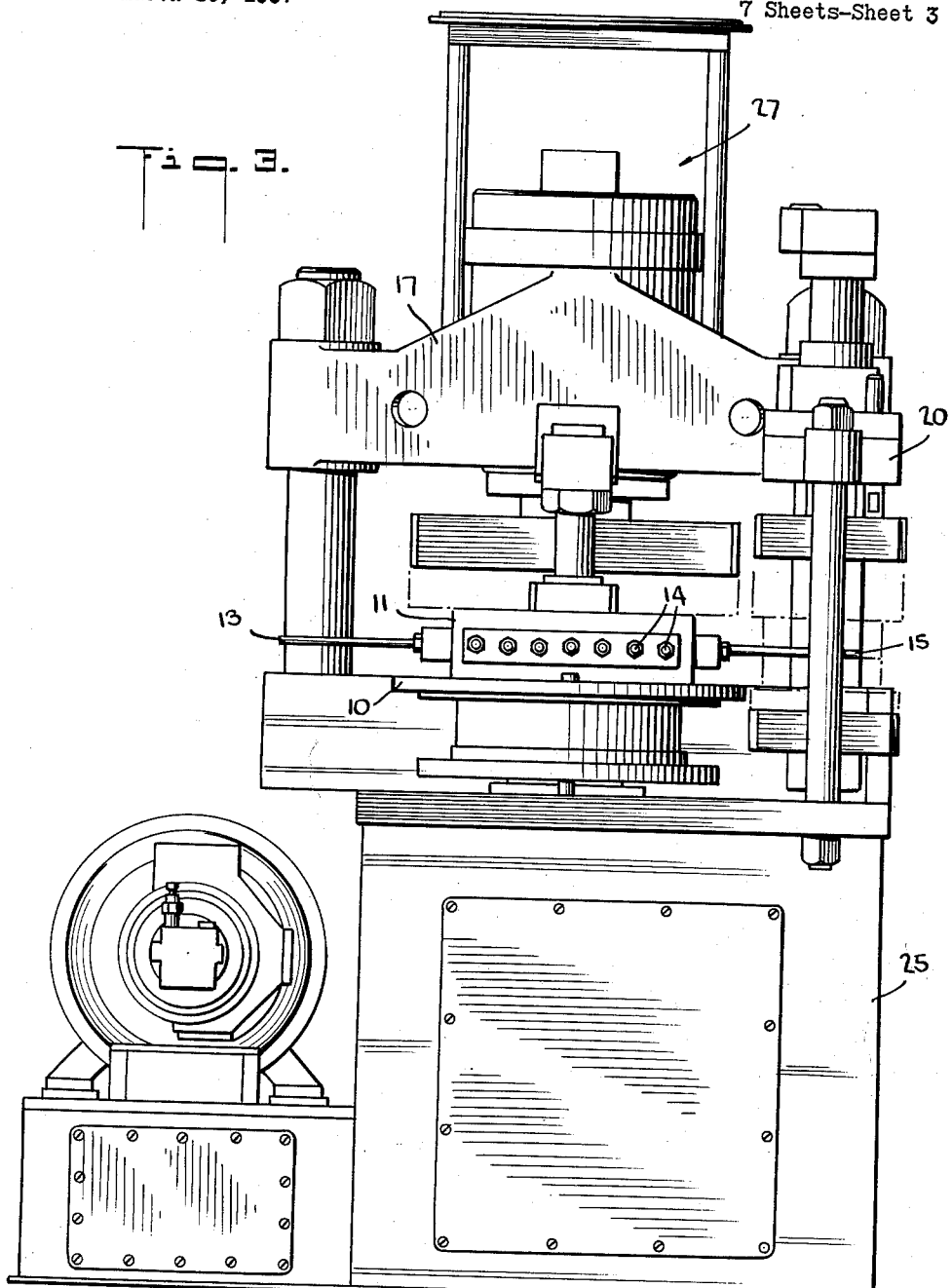
FIG. 3 is a side elevational view of said machine.
Figure 4:
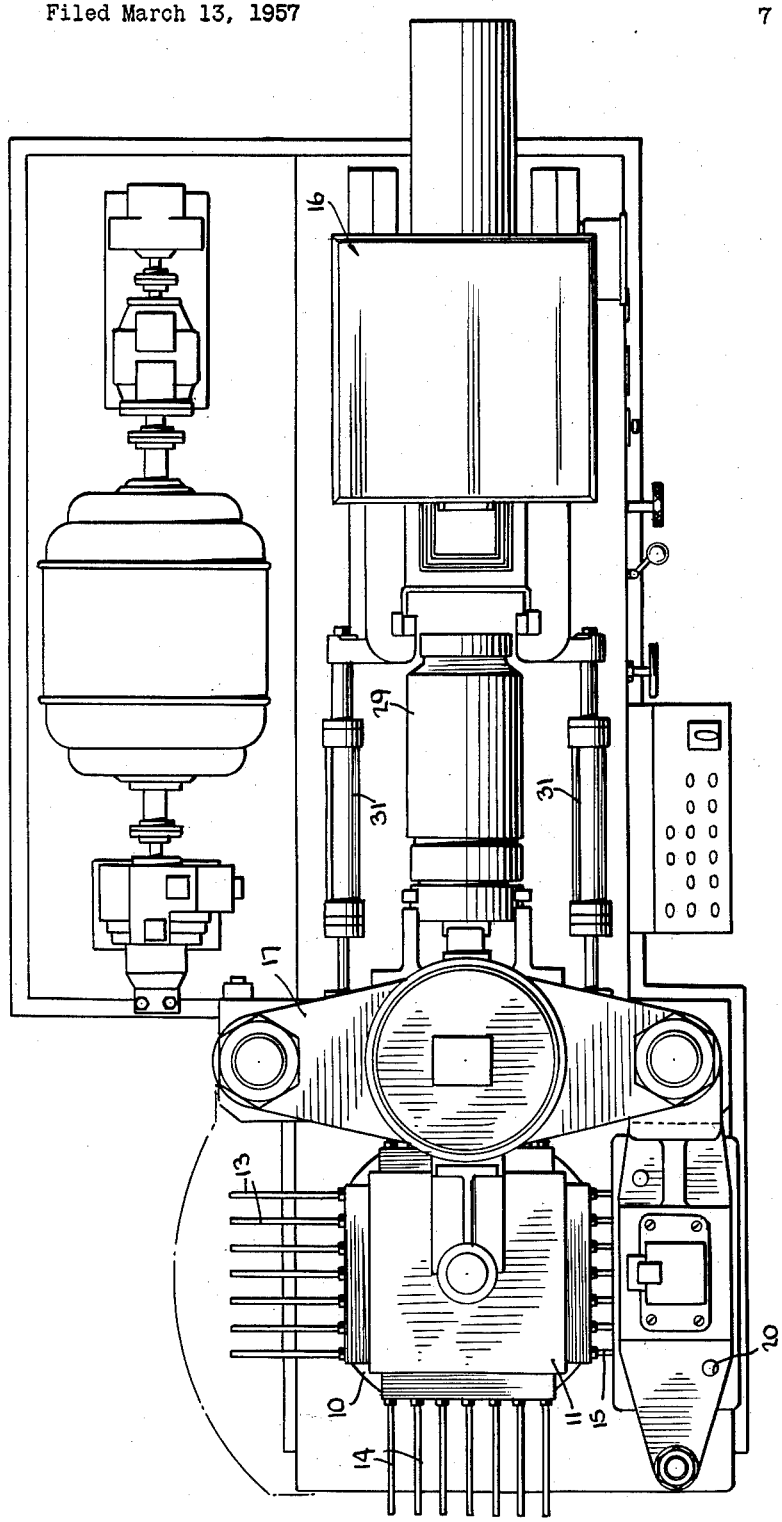
FIG. 4 is a plan view of said machine.
Figure 5:
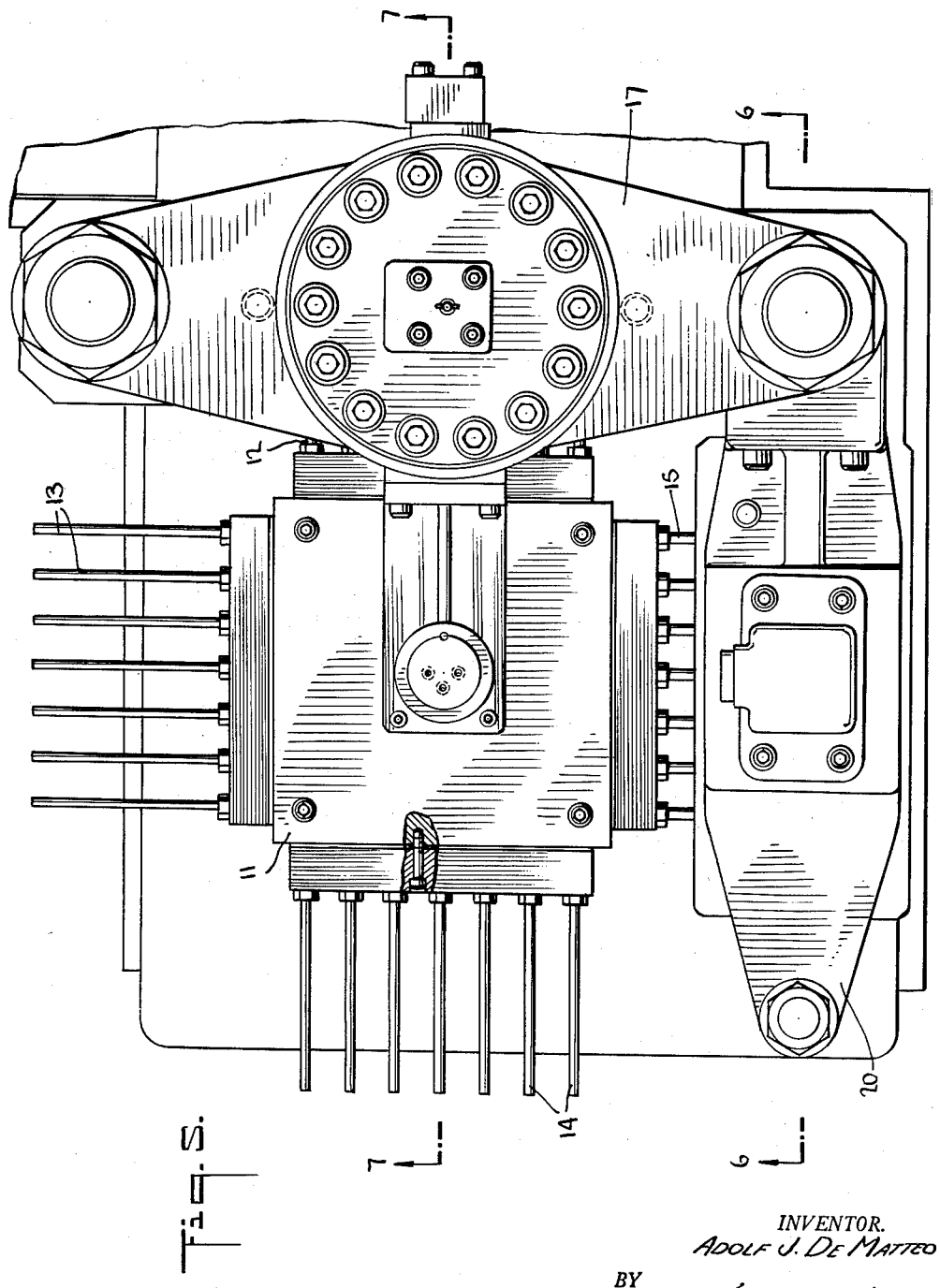
FIG. 5 is an enlarged plan view of the turntable section of the machine.

Referring now to the drawings, and more particularly to the schematic diagram in FIG. 1, the technique in accordance with the invention makes use of a turntable 10, on which is supported a square turret 11 from whose four walls are projected four distinct sets of parison pins 12, 13, 14 and 15, respectively. Each set is constituted by seven equally spaced pins, the spacing being sufficient to allow for the presence of the necessary molds. The parison pins serve to core the molded articles and, if necessary, to admit air for blowing and ejection. Turntable 10 is capable of both rotation and vertical elevation.

Surrounding the turntable in quadrature relation are four stations A, B, C and D, each station cooperating with the set of pins introduced therein. Station A is the parison molding station and comprises an injection unit 16, and a parison mold clamp 17 which acts to clamp a bank of particle parison molds 18 about the parison pins. Injection nozzles 19 are inserted into the inlets of closed molds to inject the plastic material in a state of workable plasticity therein. Station B is for blow molding and comprises a clamp 20 which acts to clamp partible blow molds 21 about the molded parisons.

At station C, the finished articles blown to size at the station B and rigidified are ejected into a suitable output hopper 22. Finally at station D, a test device 23, which may take the form of microswitches 24, acts to insure that the pins are clear of bottles, in readiness for the next operating cycle. The turntable indexes to transfer the pins successively from one station to the next, the turntable being lifted to remove the parisons from the molds and to lower the pins into their working position.

To describe the operation of the machine, let us assume at the outset that the parison pins projected into station A are in readiness for molding and the turntable is lowered into operative position. The clamp 17 then acts to bring the parison molds about the pins and the injection unit 16 is brought into operation whereby the nozzles 19 engage the inlet of the closed molds. The injection plunger on the unit is actuated to discharge plastic material in a workable state from the heating cylinder into the parison molds. On completion of the injection stroke, the injection ram returns and the injection unit is moved away from the die, breaking the sprues. Thus the injection unit is made to oscillate in engagement with the parison molds and away therefrom.

The parison dies then open, the turntable first acts to lift the parisons from the mold and thereafter indexes, bringing the molded parisons into station B, and at the same time introducing a new set of pins into the parison molds. The turntable then lowers and the blow mold closes, the parison molds closing at the same time. Air is admitted into the blow mold to inflate the parisons to their proper configuration and at the same time the parison molding cycle is repeated.

On completion of both blow and parison molding, the turntable again lifts and indexes, bringing the blown bottles to the ejector station C and transferring a new set of pins into the parison molding station A, the previously molded parisons being conveyed to the blow mold station B. The parison molding and blowing operations repeat as before, but at the ejector station C air is admitted to blow of the bottles from the parison pins. Before the parison pins are again introduced in the parison molds, their condition is tested at station D to make sure that no bottles are held thereon. In the event a bottle still rests on a pin, the test switch acts to interrupt power to the machine to permit manual removal of the bottle. Thus the cycle is continuous and its speed is limited only by the time required for the molding process.

Referring now to FIGS. 2 to 8 showing an actual machine in accordance with the invention, it will be seen that the injection unit 16 is supported for reciprocable movement on a stationary frame 25, the unit being slideable within suitable gibs 26. Mounted above the injection unit 16 is an exact-weight feeder 27 including a hopper 28. A charge of granular molding material fed into the unit is forced through a heated injection cylinder 29 under pressure by a ram 30 to plasticize the molding material and deliver it in a workable state to the parison molds. This is accomplished through the several injection nozzles 19 which communicate through a suitable manifold with the heating unit 16. Ram 30 is operated hydraulically and standard pumping equipment is employed to develop the hydraulic pressure required for the operation thereof. The movement of the injection unit to effect oscillation thereof relative to the parison molds is carried out by a pair of hydraulically operated plungers 31.

Figure 7:
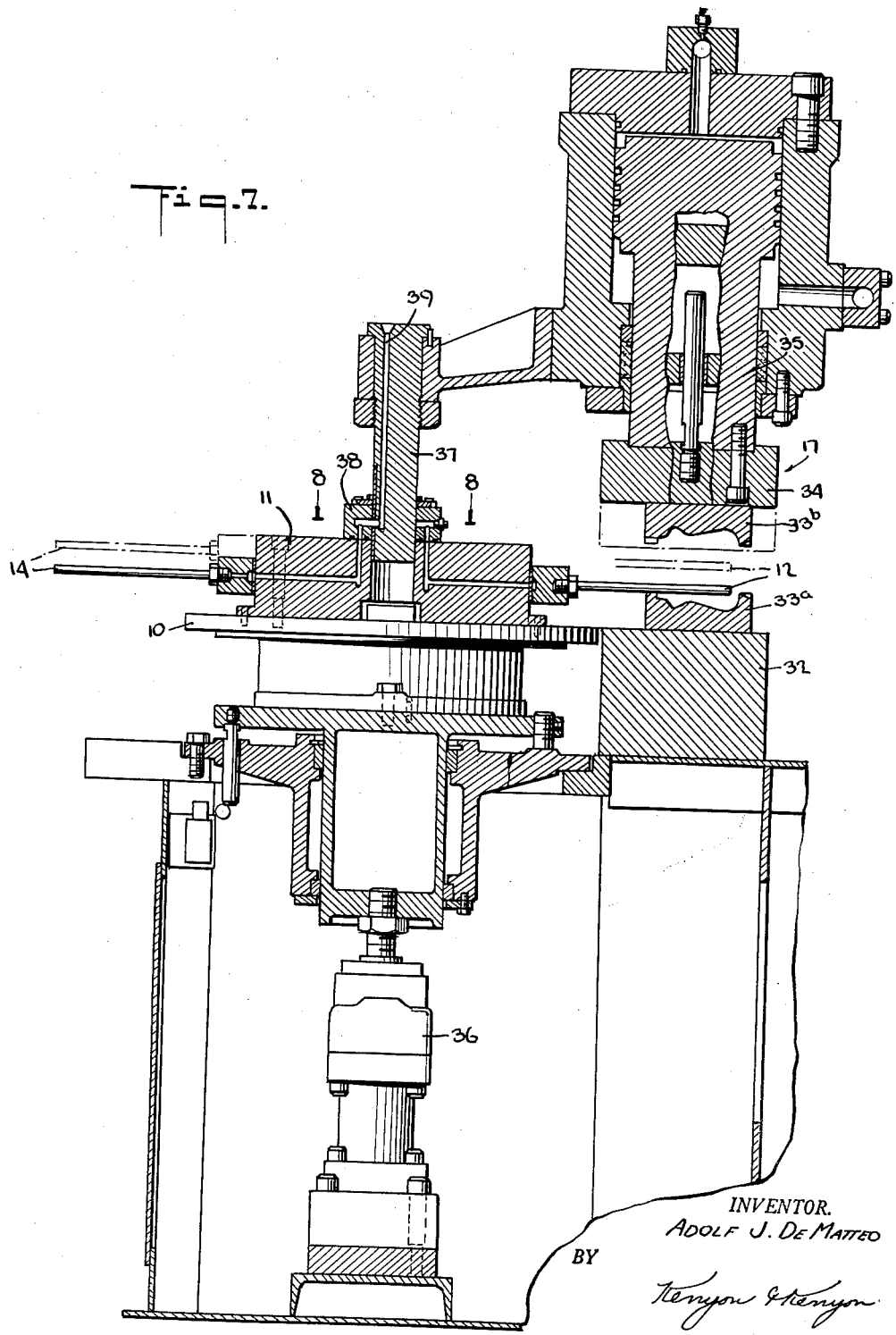
FIG. 7 is a sectional view taken along the plane of lines 7—7 in FIG. 5.

The parison clamp 17, as best seen in FIG. 7, comprises a fixed bottom plate 32 on which rests the lower half 33a of the parison molds, the upper complementary half 33b being secured to a pressure plate 34 attached to the end of a piston 35, such that when the piston is brought down hydraulically the parison mold halves close about the parisons pins to define a cavity which is filled by the plastic material. As many molds are provided as there are pins in the set. While seven pins have been shown, it is to be understood that any desired number may be employed.

Thus when the parison molds are closed and heated plastic material is fed therein, the material is kept under high pressure for a given period of time, after which the injection plunger is retracted while the injection plunger remains at rest during indexing, an additional charge of granular molding material is fed into the injection cylinder.

Also seen in FIG. 7 is the turntable 10 on which the square turret 11 is mounted. As pointed out previously, the turntable is both rotatable and elevatable, the turntable being raised and lowered by means of a jack cylinder 36 located below the underside thereof. The upper end of the turntable is supported axially by a trunnion 37.

A bearing ring 38 secured to the upper face of turret 11 is both slideable on and rotatable about the trunnion.

The parison pins are hollow and are provided with the usual one-way valves which permit outward flow of air but prevent the inward flow of material, thereby preventing entry of plastic therein. Pressurized air is fed to the parison pins at stations B, C and D through a selective valve formed by trunnion 37 in cooperation with bearing ring 38 such that air is admitted to the pins at stations B, C and D only when the pins are lowered into the operating position.

As shown in FIG. 8, extending longitudinally in trunnion 37 are three bores 39, 40 and 41, which communicate with lateral ducts 39a, 40a and 41a, positioned at 0°, 180° and 270°, respectively. In ring 38 ducts 42, 43, 44 and 45 are formed which communicate with the respective sets of pins, these ducts being positioned at 0°, 90°, 180° and 270° positions. Ducts 42 to 45 in the ring communicate with the pins through ducts 42a to 45a formed to the ring supporting turret 11. Registration between the air openings in the trunnion and the ring is effected only at the quadrature positions, whereby air is cut off during indexing movement.

Thus after the turntable indexes and is lowered so that the four sets of pins are at their associated stations, air will be fed through the ducts in trunnion 37 and the ducts in ring 38 to the sets of pins at station B (0°), station D (180°) and station C (270°), but not to station A at the 90° position, since this is where the parison is molded and no air is to be admitted.

Figure 6:
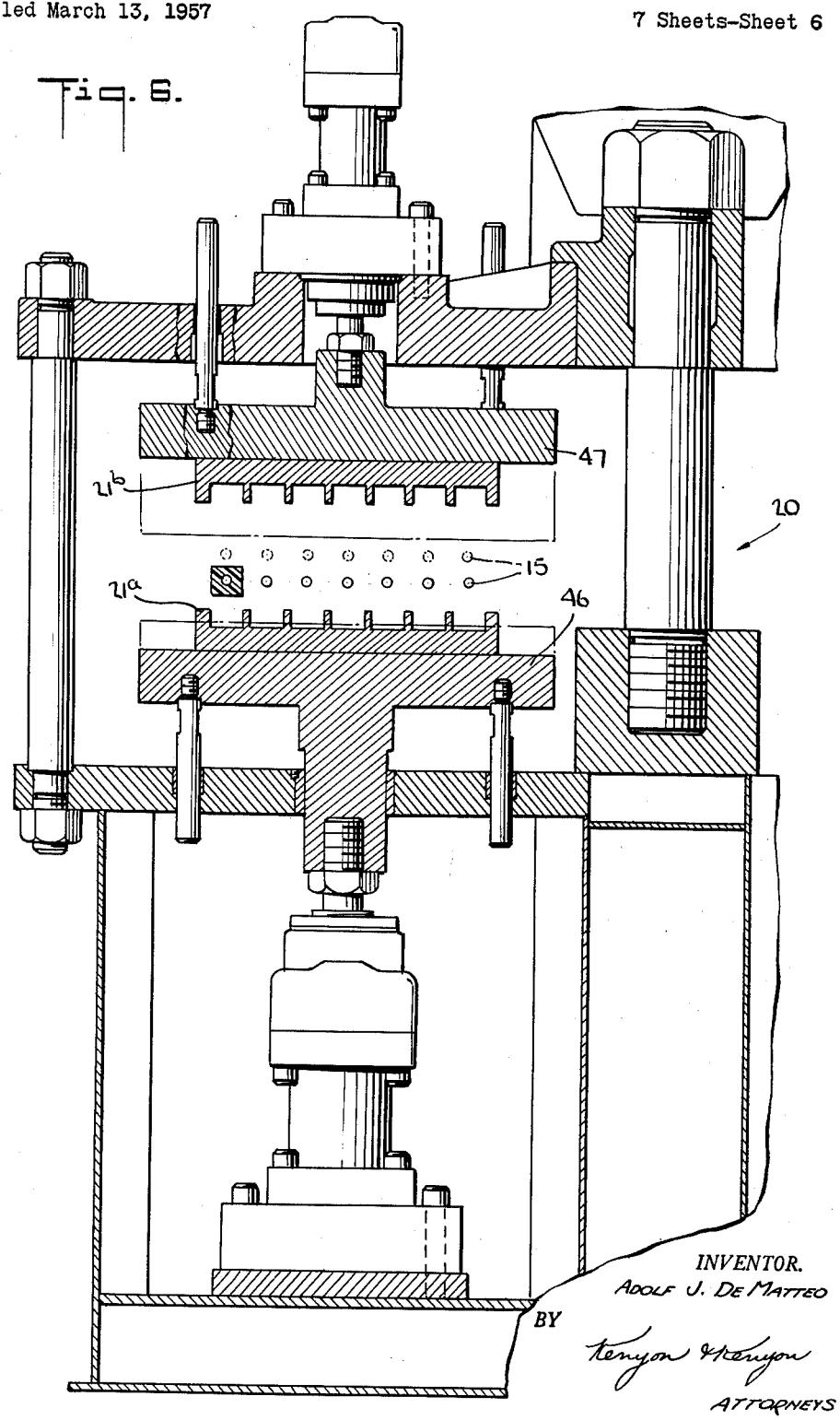
FIG. 6 is a sectional view taken along the plane lines 6—6 in FIG. 5.

As shown in FIG. 6, the blow-up mold clamp 20 includes plates 46 and 47 which are hydraulically operated to bring the two halves 21a and 21b of the blow-up mold together, the pins supporting the parisons being contained therein. The introduction of air in the pins causes expansion of the parison so that it assumes the bottle shape of the blow-up mold.

While there has been described what is considered to be a preferred embodiment of the invention, it is to be understood that many changes and modifications may be made therein without departing from the essential character of the invention. For example, rather than cause the turntable to lift before indexing in order to clear the molds, it is also possible to separate both halves of the molds to provide clearance for the pins whereby indexing may be accomplished entirely by rotary motion. It is intended, therefore, in the accompanying claims to cover all such changes and modifications as fall within the true spirit of the invention.

What is claimed is:

1. An injection molding machine for automatically forming hollow articles of plastic material comprising a turntable provided with a turret from which project distinct sets of parison pins, said turret having separate air ducts formed therein communicating with respective sets of said pins, operating stations surrounding said turntable, means to index said turntable to cause each set of pins to occupy successive stations, means at one station to mold parisons on said pins, means at a second station to blow up said parisons to a desired shape, means at a third station to eject the finished parisons, means at a fourth station to test said pins for the presence of articles prior to the re-introduction thereof into said first station, and selective valve means cooperating with said turntable to supply air solely to those sets of pins stationed at said blow-up, ejection stations and testing stations.

2. An injection molding machine for automatically forming hollow articles of plastic material, said machine comprising a turntable provided with a square turret from whose walls project four sets of parison pins, said turret having separate air ducts formed therein communicating with respective sets of said pins, four stations surrounding said turntable to cooperate with respective sets of pins, means to index said turntable to cause each set of pins successively to occupy said stations, the first station including parison molds, means to clamp said molds about said pins, and means to inject plastic material into said molds under pressure, the second station including blow-up molds and means to clamp said molds about said pins, the third station including hopper means to receive ejected finished articles, the fourth station including means to test said pins to insure clearance thereof prior to re-introduction into said first station, means to index said turntable to cause each set of pins to travel from station to station in the order given and to occupy said stations for a period sufficient to complete said molding operations, and selective valve means operatively coupled with said turntable to feed air through the related turret ducts into said pins at said second, third and fourth stations.

3. An injection molding machine for automatically forming hollow articles of organic plastic material, said machine comprising a turntable provided with a square turret from whose walls project four sets of parison pins, said turret having separate air ducts formed therein communicating with respective sets of said pins, four stations surrounding said turntable to cooperate with respective sets of pins, means to index said turntable to cause each set of pins to occupy successive stations, the first station including partible parison molds, means to clamp the mold halves about said pins, and an injection unit to inject plastic material in the workable state into said molds under pressure, the second station including partible blow-up molds and means to clamp said mold halves about said pins, the third station including hopper means to receive ejected finished articles, the fourth station including switch means to test said pins to insure clearance thereof prior to re-introduction into said first station, means to index said turntable to cause each set of pins to transfer from station to station in the order given and to occupy said stations for a period sufficient to complete said molding operations, means to elevate said turntable prior to each indexing step to remove said pins from said molds and thereafter to lower said turntable, and selective valve means operatively coupled with said turntable to feed air through the related ducts solely into said pins at said second, third and fourth stations.

4. An injection molding machine for automatically forming hollow articles of plastic material, said machine comprising a turntable provided with a square turret from whose walls project four sets of parison pins, said turret having separate air ducts formed therein communicating with respective sets of said pins, four stations circumferentially surrounding said turntable at quadrature positions, the first station including a plurality of partible parison molds equal in number to the pins in a set, separable clamp means to bring said partible molds together, and an injection unit reciprocably mounted relative to said parison molds and having a like plurality of nozzles engageable therewith when said molds are clamped together to feed plastic therein, the second station including a like plurality of partible blow-up molds and separable clamp means to bring said molds together, the third station including hopper means to receive ejected finished articles, the fourth station including switches cooperatively arranged relative to said pins to test for the presence of articles thereon and means to arrest said machine in such event, means to index said turntable to cause transfer of each set of pins successively from station to station, said pins remaining at said stations for a period sufficient to complete the molding operations, and selective valve means operated by said indexing means to feed air through the related turret ducts into said pins at all stations but said first station.

5. An injection molding machine for automatically forming hollow articles of plastic material, said machine comprising a rotatable turntable provided with a square turret from whose walls project four sets of hollow parison pins, said turret having separate air ducts formed therein communicating with respective sets of said pins, four operating stations circumferentially surrounding said turntable at quadrature positions, the first station including a plurality of partible parison molds equal in number to the pins in a set, separable clamp means to bring the halves of said partible molds together about said pins, and an injection unit reciprocably mounted relative to said parison molds and having a like plurality of nozzles engageable with the inlets of the closed molds, the nozzles being retractable to break the sprues, the second station including a like plurality of partible blow-up molds and separable clamp means to bring said molds together, the third station including hopper means to receive ejected finished articles, the fourth station including switches cooperatively arranged relative to said pins to test for the presence of articles thereon and means to arrest said machine in such event, means to index said turntable to cause transfer of each set of pins successively from station to station and to occupy said station for a period sufficient to complete said molding operations, means to elevate said turntable prior to indexing to remove said pins from said molds, and selective valve means operated by said indexing means to feed air through the related ducts into said pins at all stations but said first station.

6. A machine as set forth in claim 1, wherein said selective valve means to supply air to said sets of pins includes a cylindrical trunnion for supporting one end of said turntable and including bores at angularly spaced positions which are adapted to register with the respective ducts leading to said sets of pins and formed in a ring secured to said turntable and rotatable therewith about said trunnion.

References Cited in the file of this patent

UNITED STATES PATENTS

| | | |
|---|---|---|
| 1,603,979 | Peiler | Oct. 19, 1926 |
| 2,297,596 | Westin | Sept. 29, 1942 |
| 2,298,716 | Moreland et al. | Oct. 13, 1942 |
| 2,331,687 | Hobson | Oct. 12, 1943 |
| 2,444,339 | Dinzl | June 29, 1948 |
| 2,649,943 | Meyers | Aug. 25, 1953 |
| 2,715,751 | Weber | Aug. 23, 1955 |
| 2,853,736 | Gussoni | Sept. 30, 1958 |

FOREIGN PATENTS

| | | |
|---|---|---|
| 149,609 | Australia | Jan. 7, 1953 |
| 165,061 | Australia | Sept. 7, 1955 |